(12) United States Patent
Gonsalves, III et al.

(10) Patent No.: US 8,133,300 B1
(45) Date of Patent: Mar. 13, 2012

(54) SYSTEMS AND METHODS FOR OIL/GAS SEPARATION

(75) Inventors: Louis C. Gonsalves, III, Tulsa, OK (US); George Alan Sweetman, Owasso, OK (US)

(73) Assignee: S&R Compression, LLC, Tulsa, OK (US)

( * ) Notice: Subject to any disclaimer, the term of this patent is extended or adjusted under 35 U.S.C. 154(b) by 663 days.

(21) Appl. No.: 12/243,651

(22) Filed: Oct. 1, 2008

Related U.S. Application Data

(60) Provisional application No. 61/085,314, filed on Jul. 31, 2008.

(51) Int. Cl.
*B01D 19/00* (2006.01)

(52) U.S. Cl. .................. 95/19; 95/252; 95/253; 95/254; 95/262

(58) Field of Classification Search ............ 95/251–254, 95/262; 96/184–189, 197–201, 218–220
See application file for complete search history.

(56) References Cited

U.S. PATENT DOCUMENTS

| | | | | |
|---|---|---|---|---|
| 2,016,642 A * | 10/1935 | Lincoln | ........................... | 96/185 |
| 2,738,026 A * | 3/1956 | Glasgow et al. | ................ | 95/158 |
| 2,751,998 A * | 6/1956 | Glasgow | ........................... | 95/24 |
| 2,812,034 A * | 11/1957 | McKelvey, Jr | .................. | 96/190 |
| 2,825,422 A * | 3/1958 | Schoenfeld | ...................... | 96/159 |
| 3,025,928 A * | 3/1962 | Heath | ............................... | 95/18 |
| 3,133,975 A * | 5/1964 | Warren et al. | ................. | 585/716 |
| 3,255,574 A * | 6/1966 | Glasgow | .......................... | 95/252 |
| 3,266,227 A * | 8/1966 | Plizak et al. | ..................... | 55/426 |
| 3,335,549 A * | 8/1967 | Hendrix | ........................... | 96/179 |
| 3,450,632 A * | 6/1969 | Huval et al. | ................... | 210/799 |
| 3,672,127 A * | 6/1972 | Mayse et al. | ................... | 204/662 |
| 3,917,474 A * | 11/1975 | Heckenkamp et al. | ......... | 96/189 |
| 4,139,019 A * | 2/1979 | Bresie et al. | .................. | 137/351 |
| 4,359,329 A * | 11/1982 | Willeitner | ....................... | 55/320 |
| 4,539,023 A * | 9/1985 | Boley | ............................... | 96/184 |
| 4,579,565 A * | 4/1986 | Heath | ............................... | 95/15 |
| 4,617,808 A | 10/1986 | Edwards | | |
| 4,995,792 A | 2/1991 | Brown et al. | | |
| 5,132,011 A * | 7/1992 | Ferris | .............................. | 96/184 |

(Continued)

OTHER PUBLICATIONS

"Lessons Learned From Natural Gas STAR Partners" United States EPA, Oct. 2003, http://www.epa.gov/gasstar/pdf/lessons/ll_final_vap.pdf, (12 pages).

(Continued)

*Primary Examiner* — Duane Smith
*Assistant Examiner* — Ives Wu
(74) *Attorney, Agent, or Firm* — Meyertons, Hood, Kivlin, Kowert & Goetzel, P.C.; Eric B. Meyertons

(57) ABSTRACT

In some embodiments, a chamber may be configured to separate oil and gas. For example, the oil and gas may be separated as they exit a compressor, an oil storage tank, etc. In some embodiments, the gas may be a heavy gas and the oil may be compressor oil. One or more heated baffles may interact with the oil and gas to increase the velocity of the gas flow to inhibit the gas from absorbing into the oil. In some embodiments, when the compressor feeding the chamber is operating at a decreased compression rate, the chamber may continue to heat the oil to vaporize impurities out of the oil. The impurities may then be vented out of the chamber through the bleed valve to a gas inlet scrubber.

7 Claims, 10 Drawing Sheets

U.S. PATENT DOCUMENTS

| | | | |
|---|---|---|---|
| 5,139,390 A | 8/1992 | Rajewski | |
| 5,167,829 A * | 12/1992 | Diamond et al. | 210/708 |
| 5,195,587 A | 3/1993 | Webb | |
| 5,242,475 A * | 9/1993 | Stine et al. | 55/319 |
| 5,480,475 A | 1/1996 | Tuttle | |
| 5,630,328 A * | 5/1997 | Hise et al. | 62/619 |
| 5,651,389 A | 7/1997 | Anderson | |
| 6,354,822 B1 | 3/2002 | Lifson et al. | |
| 6,673,135 B2 * | 1/2004 | West | 95/268 |
| 6,880,360 B2 * | 4/2005 | Barratt et al. | 62/473 |
| 7,140,852 B2 | 11/2006 | Koide et al. | |
| 7,186,099 B2 | 3/2007 | Elson et al. | |
| 7,311,501 B2 | 12/2007 | Wehrenberg et al. | |
| 7,338,552 B2 | 3/2008 | Bauer | |
| 7,347,945 B2 * | 3/2008 | Amado et al. | 210/739 |
| 7,350,581 B2 | 4/2008 | Wynn | |
| 7,686,859 B2 * | 3/2010 | Barratt | 55/423 |
| 7,857,882 B1 * | 12/2010 | Johnson | 55/385.3 |
| 2006/0057012 A1 | 3/2006 | Park et al. | |
| 2007/0220850 A1 | 9/2007 | Thompson | |
| 2008/0008612 A1 | 1/2008 | Kim et al. | |
| 2008/0193312 A1 | 8/2008 | Ignatiev et al. | |
| 2008/0219872 A1 | 9/2008 | Reinhart et al. | |
| 2008/0286118 A1 | 11/2008 | Gu et al. | |

OTHER PUBLICATIONS

Elson et al. "A Hermetic Scroll Compressor For Application To High Heat-Of-Compression Gases" Emerson Process Management White Paper, 2004 (http://www.emersonclimate.com/oil_gas/PDF/HermeticScrollCompressorWhitePaper.pdf).

* cited by examiner

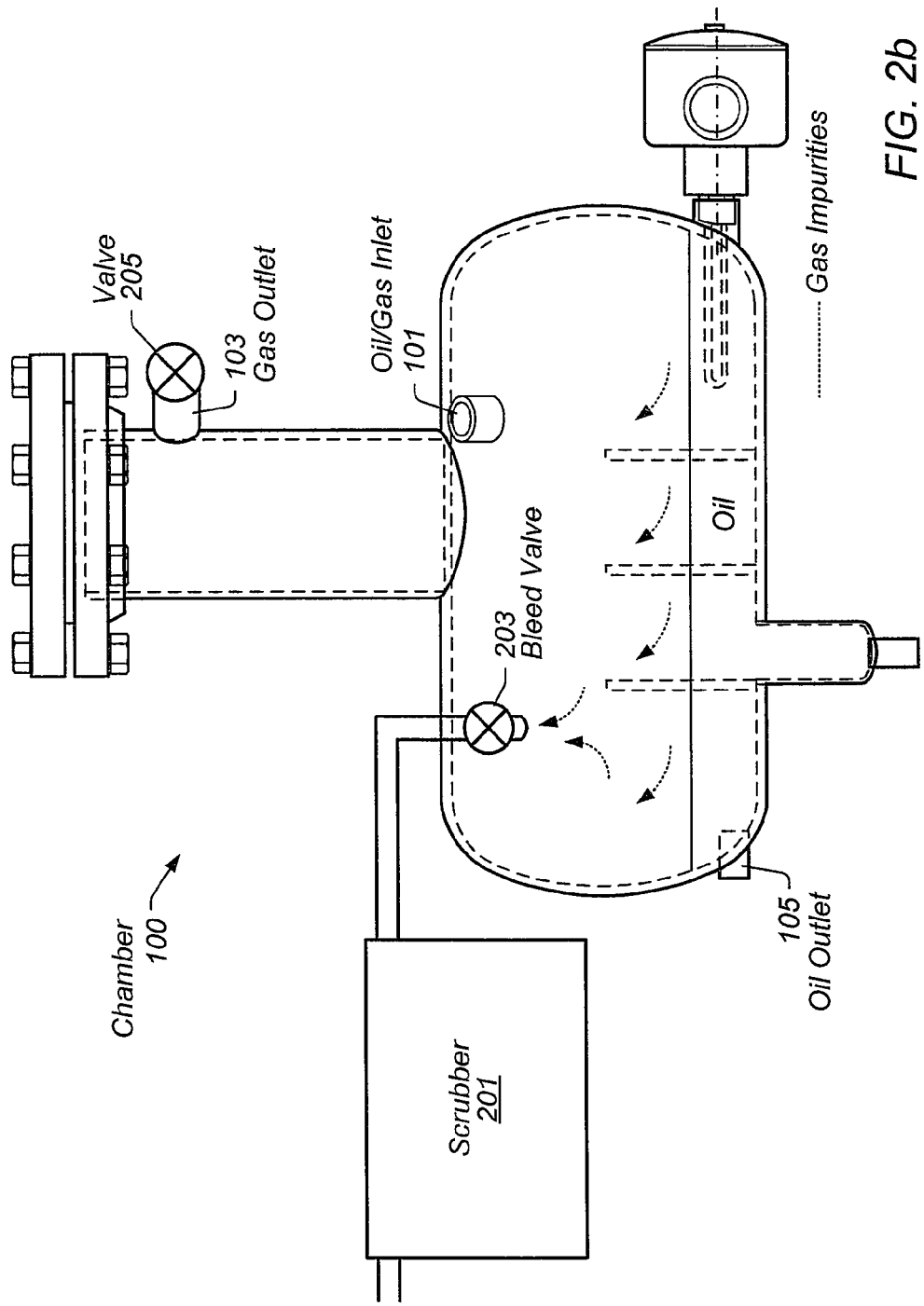

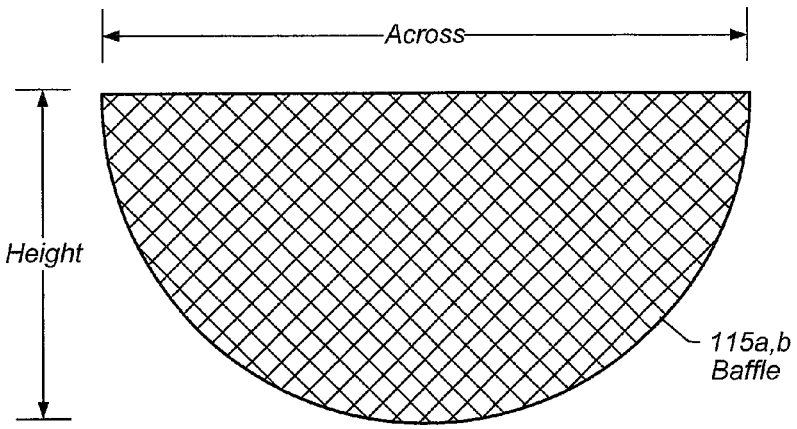
*FIG. 5a*
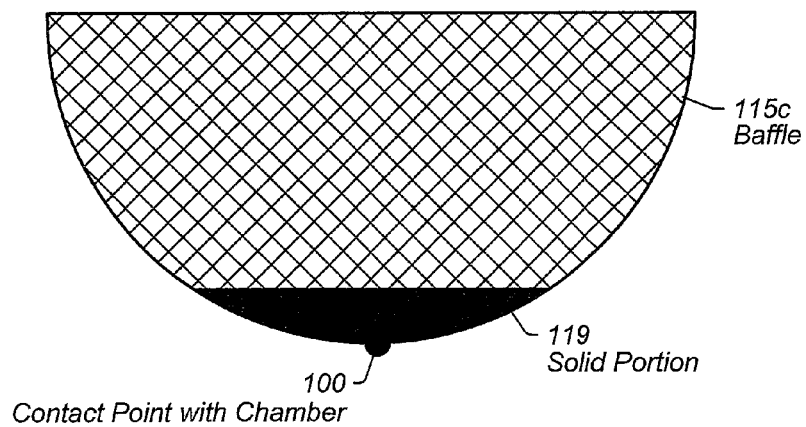
*FIG. 5b*
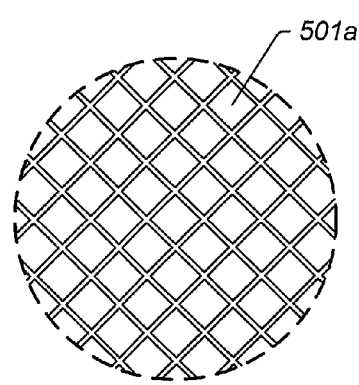 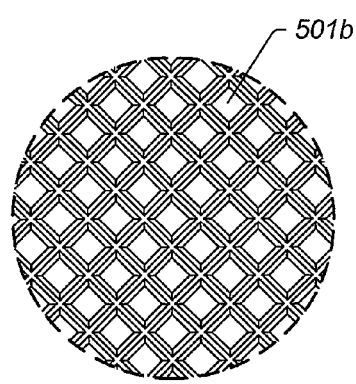
*FIG. 5c*          *FIG. 5d*

SYSTEMS AND METHODS FOR OIL/GAS SEPARATION

PRIORITY CLAIM

This application claims the benefit of priority of U.S. Provisional Patent Application Ser. No. 61/085,314 titled "SYSTEMS AND METHODS FOR OIL/GAS SEPARATION", filed on Jul. 31, 2008, whose inventors are Louis C. Gonsalves III and George Alan Sweetman, which is hereby incorporated by reference in its entirety as though fully and completely set forth herein.

BACKGROUND

Oil storage tanks may be used to store oil from production wells prior to transportation (e.g., through a pipeline, truck, etc). Various gases dissolved in the oil may vaporize out of the oil and collect toward the top of the storage tank. Gases may include methane, propane, butane, ethane, etc. These gases may be pumped from the storage tanks to be used or sold. Compressors may be used to transfer gas from the oil storage tanks to, for example, a pipeline or truck for transportation.

SUMMARY

In some embodiments, a chamber may be configured to separate oil and gas. For example, the oil and gas may be separated as they exit a compressor, an oil storage tank, etc. In some embodiments, the gas may be a heavy gas (e.g., a high British Thermal Unit (BTU) gas with hydrocarbons) and the oil may be compressor oil (e.g., used in a scroll or screw compressor to compress and/or move the gas). In some embodiments, the chamber may receive the oil and gas at an inlet to the chamber. The oil may leave the chamber through an oil outlet (where it may be returned to a storage tank, compressor, etc.) and the gas may leave the chamber through a gas outlet (where it may be stored, combusted, transported, etc). A series of heated baffles in the chamber may interact with gas to heat and accelerate the gas to prevent the gas from absorbing into and diluting the oil. For example, the gas's velocity and increased temperature may keep the gas from liquefying and combining with the oil. In some embodiments, the baffles may be heated along with the chamber interior by a heater. The baffles may spread out and heat the gas by providing more contact area between the gas and the heated metal of the baffles. In some embodiments, the oil may descend to the bottom of the chamber (e.g., the oil may flow along the surfaces of the baffles and/or along the sides of the chamber). In some embodiments, a liquid drain may be used to drain fluids such as water and other impurities that become trapped in the lower part of the chamber.

In some embodiments, the oil and gas may be received from a compressor operating at two or more compression states (e.g., a first compression state and a lower pressure, second compression state). When the compressor feeding the chamber is operating at a lower pressure compression state (e.g., below a predetermined pressure), a valve may close off the gas outlet and a separate bleed value may open. The oil in the chamber may be heated and impurities in the oil (e.g., hydrocarbons, water, etc.) may be heated out of the oil. The impurities may be vented from the chamber through a bleed valve and may enter a scrubber.

BRIEF DESCRIPTION OF THE DRAWINGS

A better understanding of the present invention may be obtained when the following detailed description is considered in conjunction with the following drawings, in which:

FIGS. 2*a-b* illustrate oil and gas flow in the chamber, according to an embodiment.

FIGS. 5*a-b* illustrate side profiles of baffles for the chamber, according to an embodiment.

FIGS. 5*c-d* illustrate embodiments of baffle openings, according to an embodiment.

Figure 1:
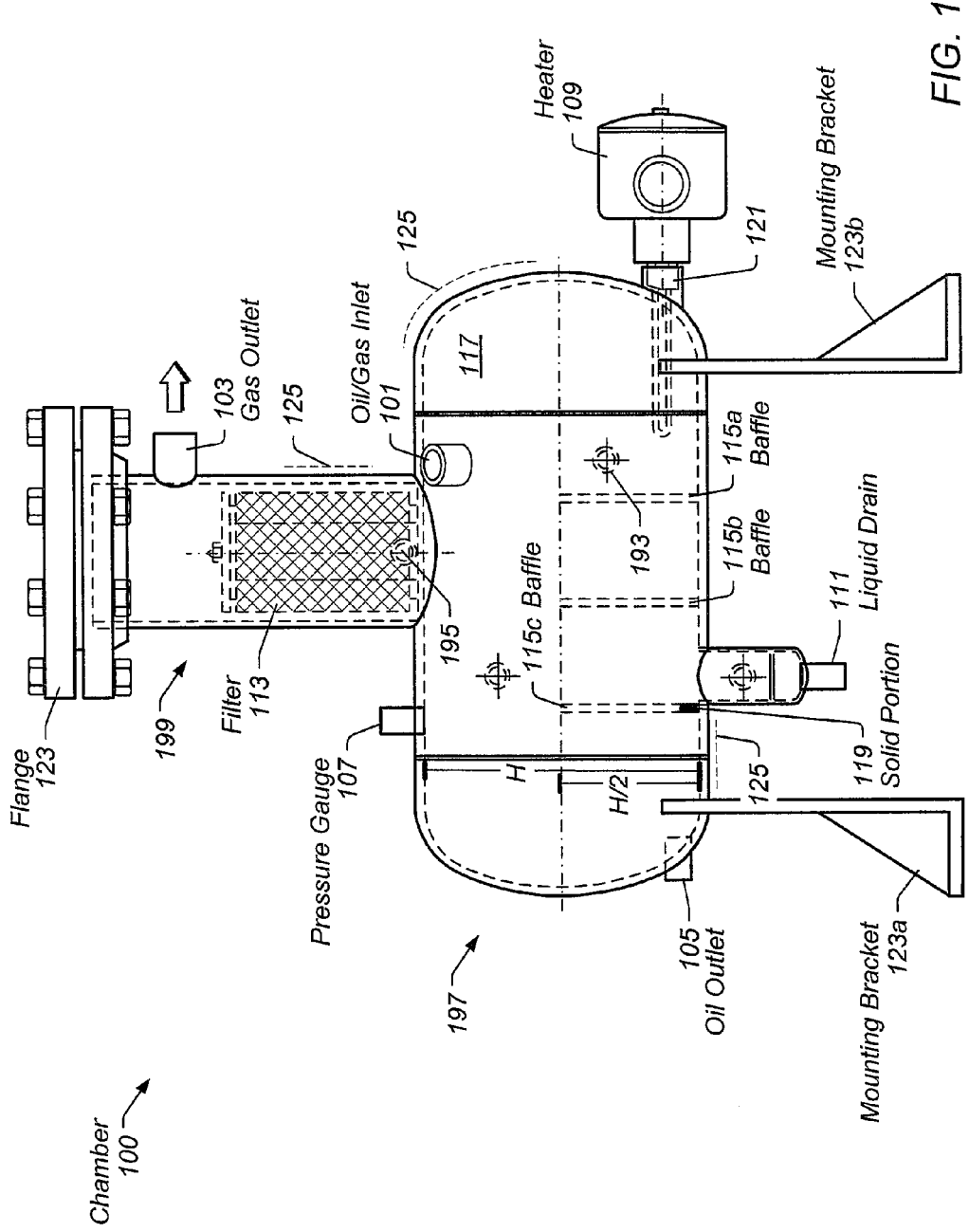
FIG. 1 illustrates a front view of a chamber for separating oil and gas, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

FIG. 1 illustrates an embodiment of chamber 100 for separating oil and gas. Chamber 100 may be used to separate oil and gas that are, for example, exiting a compressor, an oil storage tank, etc. In some embodiments, the gas may include hydrocarbons (e.g., methane, ethane, propane, butane, pentane, octane, etc). In some embodiments, the gas may be a heavy gas (e.g., a high British Thermal Unit (BTU) value gas). For example, the gas may have a BTU value approximately in a range of 1500-2200 BTU (other gases and gas values are also contemplated). The oil may be compressor oil, crude oil, etc. Chamber 100 may also be used to separate gas from other substances (e.g., refrigerants).

In some embodiments, chamber 100 may be constructed of metal (e.g., stainless steel, copper, iron, etc). Other materials may also be used for chamber 100 (e.g., high strength plastic, wound carbon fiber, etc). In some embodiments, chamber 100 may be one piece (e.g., molded) or may be constructed of several pieces (e.g., main cylinder portion 197 (with two welded elliptical endcaps) coupled to second cylinder portion 199). Main cylinder 197 may have a diameter approximately in a range of 0.5 to 2 feet and a length approximately in a range of 1 to 4 feet. Second cylinder portion 199 may have a diameter approximately in a range of 2 to 8 inches and a length approximately in a range of 0.5 to 2 feet. Other dimensions are also contemplated (e.g., dimensions may vary, for example, depending on a flowrate of oil/gas, type of oil/gas, etc). Other configurations for the chamber 100 are also contemplated (e.g., chamber 100 may be box-shaped).

Figure 3:
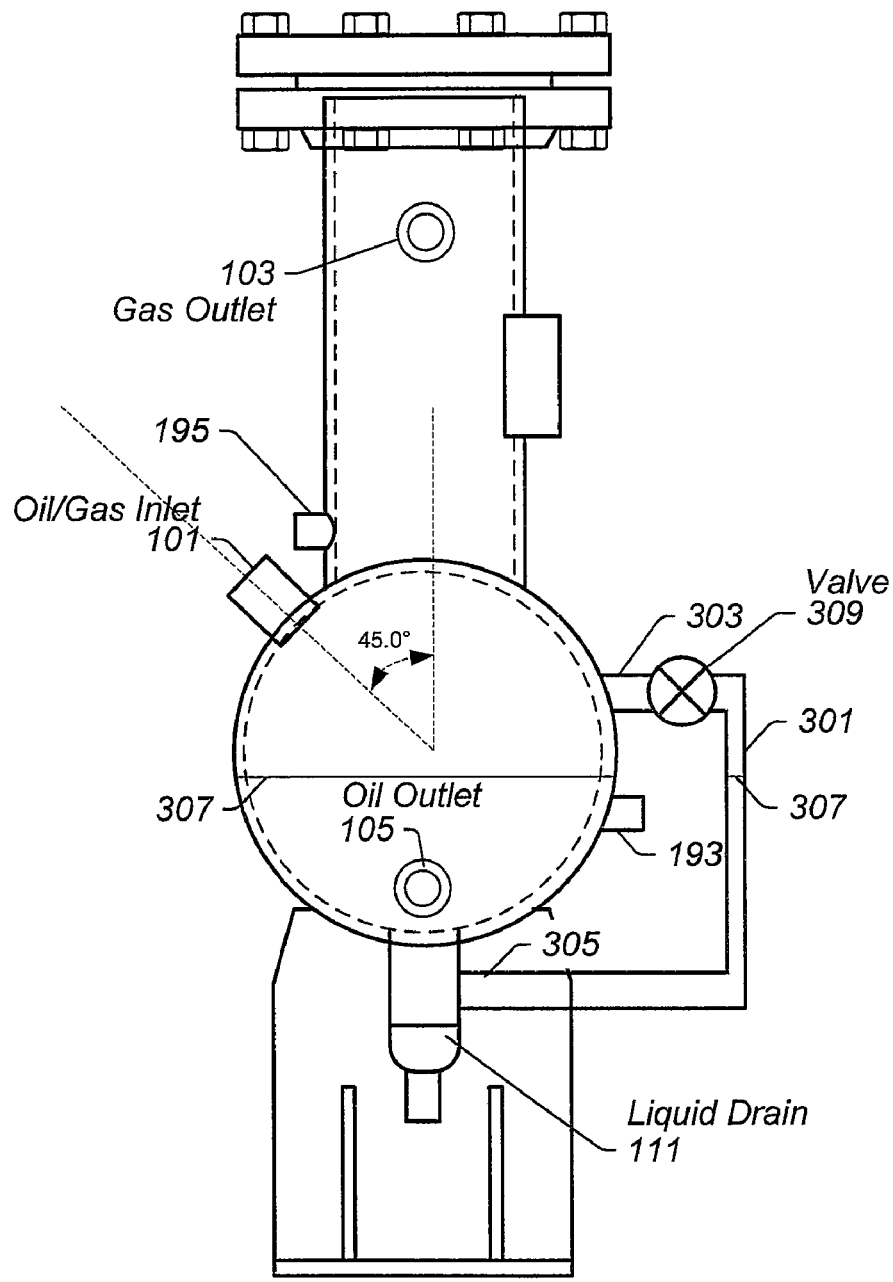
FIG. 3 illustrates a side view of the chamber for separating oil and gas, according to an embodiment.

In some embodiments, chamber 100 may receive the gas and oil at inlet 101 (see, e.g., FIGS. 1 and 3). Inlet 101 may include a hole, pipe, valve, etc. leading from an exterior of chamber 101 into an interior of chamber 101. Inlet 101 may be near a top of chamber 100 (terms such as "top", "bottom", and "side" used herein are used to refer to positions on chamber 100 when chamber 100 is in an operating position (e.g., as seen in FIG. 1)). In some embodiments, inlet 101 may be positioned at approximately a 45 degree angle to chamber 100 (e.g., see FIG. 3). Other angles are also contemplated (e.g., an angle approximately in a range of 0 degrees to 180 degrees with respect to chamber 100). Other positions for inlet 101 are also contemplated (e.g., inlet 101 may be on a side of chamber 100). The oil and gas may enter chamber 101 under pressure (e.g., from the outlet of a compressor). For example, pressure inside chamber 100 may be approximately in a range of 60 to 100 pounds per square inch (psi). Other pressures are also contemplated (e.g., 0-60 psi, 100-1000 psi, etc). In some embodiments, the oil may be compressor oil used to compress/move the gas. Because the components (e.g., the hydrocarbons) of the gas may dilute the compressor oil if the gas liquefies and mixes with the oil (diluted compressor oil may lead to compressor damage and/or shorter compressor life), chamber 100 may be configured to substantially prevent liquefaction of the gas and may allow the gas and oil to leave through different outlets (e.g., outlets 103 and 105).

In some embodiments, chamber 100 may include open portion 117 in the top portion of chamber 100 (e.g. the top half of chamber 100 may be open). Chamber 100 may also include one or more baffles (e.g., baffles 115a-c) (e.g., extending from a bottom portion of chamber 100). In some embodiments, baffles 115a-c (see FIGS. 5a-b) may include substantially planar mesh (e.g., including criss crossing wires, metal strips, molded screen (e.g., see FIGS. 5c-d)) etc.) extending from a bottom of chamber 100 and along sides of chamber 100 into an interior of chamber 100. For example, main portion 197 of chamber 100 may be substantially cylindrical and baffles 115a-c may be planar mesh with a rounded bottom (e.g., see FIGS. 5a-b) to follow a bottom contour of main portion 197 of chamber 100. Other profiles of baffles 115a-c are also contemplated (e.g., if chamber 100 is box-like, baffles 115a-c may have square bottoms to follow the bottom contour of the chamber). The planar mesh may be a planar metal mesh (e.g., made of stainless steel). Other materials may also be used (e.g., high strength plastic). Baffles 115a-c may be welded into chamber 100 (e.g., prior to welding endcaps onto chamber 100). Other fastening methods are also possible (e.g., adhesive). Other configurations of baffles 115a-c are also contemplated (e.g., baffles 115a-c may extend from an inner top of main chamber 197).

In some embodiments, baffles 115a-c may reduce a cross sectional area for the flow of gas and oil through chamber 100. The reduced cross-sectional area may force the gas (and, in some embodiments, oil) to compress and expand through the openings in the mesh of baffles 115a-c. The expansion may result in a local acceleration of the gas through the openings in the mesh. The greater speed of the gas may keep the oil and gas separate and/or may act to separate the oil and gas (e.g., by preventing liquefaction of the gas). In some embodiments, while the speed of the gas through the openings may increase, the pressure of the gas may drop after traveling through the mesh. In some embodiments, the heat of the mesh may offset the pressure drop of the gas (e.g., the heat may increase the pressure of the gas). In some embodiments, the oil may descend to the bottom of chamber 100 (e.g., the oil may flow along the surfaces of baffles 115a-c and/or sides of chamber 100).

Three baffles 115a-c are shown in FIG. 1, however, other numbers of baffles 115a-c may also be used. In some embodiments, baffles 115a-c may be evenly distributed. Baffles 115a-c may rise to approximately half the height of chamber 100. Other configurations are also contemplated. For example, baffles 115a-c may extend to ¼ of height of chamber 100, ¾ of height of chamber 100, etc. In some embodiments, baffle 115c may be approximately one foot across and approximately six inches in height and approximately half an inch thick. Other configurations are also contemplated. In some embodiments, the openings in the mesh (e.g., between the wires, strips, molded openings, etc.) may have diameters approximately in a range of 0.4-0.6 inches. Other diameter dimensions are also contemplated. Other dimensions for baffles 115a-c and mesh openings may also be used (e.g., dimensions may vary depending, for example, on a flowrate of oil/gas, type of oil/gas, size of chamber 100, etc). Mesh openings may be square (e.g., see opening 501a in the baffle section of FIG. 5c), round, irregular, etc. Mesh openings in baffles 115a-c may also be configured as a group of funnels. For example, the cross sectional area of the openings (e.g., opening 501b (FIG. 5d)) in the mesh may decrease along a thickness of baffle 115 (e.g., the oil/gas may enter baffle 115a through an opening with a bigger cross sectional area than the cross sectional area of the opening on the other side of baffle 115 that the oil/gas exits baffle 115a through). Other configurations of baffles 115a-c are also contemplated. In some embodiments, an oil level inside chamber 100 may not exceed the height of baffles 115a-c. For example, an oil level in chamber 100 during operation may rise to a level approximately in a range of 20-50% of the interior diameter of chamber 100 (e.g., to a level at 35% of the interior diameter). Other ranges are also contemplated.

Figure 4:
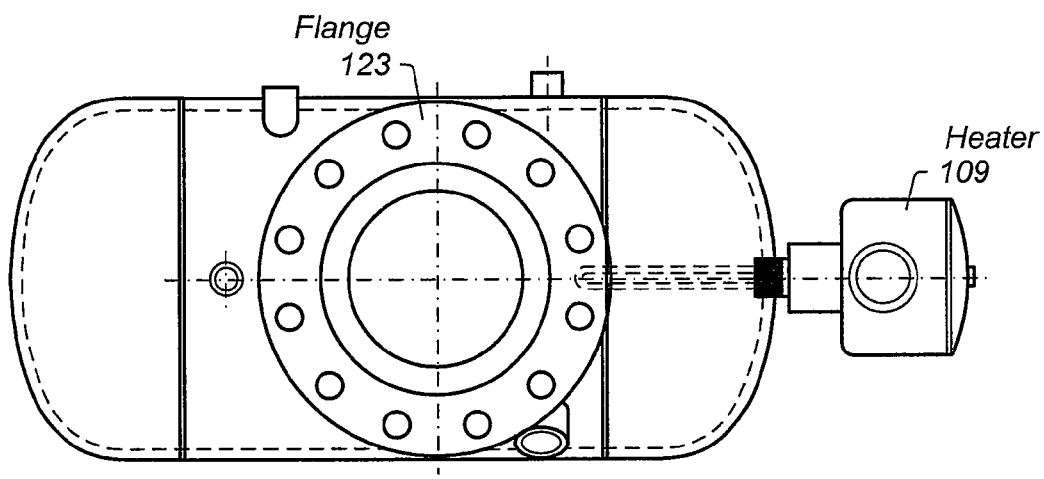
FIG. 4 illustrates a top view of the chamber for separating oil and gas, according to an embodiment.

In some embodiments, chamber 100 and baffles 115a-c may be heated by heater 109 (see, e.g., FIGS. 1 and 4). Heater 109 may include a heater element thermally coupled to chamber 100 and/or a substance (e.g., the oil and gas) in chamber 100. Heat may travel through chamber 100 and/or baffles 115a-c through conduction, convection, and/or radiation. Heater 109 may include an electric heater, gas heater, chemical heater, convection heater, induction heater, etc. Heater 109 may include a heating filament surrounded by a protective tube (e.g., a steel tube, aluminum tube, etc. protecting a heating element from the oil/gas) protruding into chamber 100. In some embodiments, heater 109 may be screwed into inlet 121 to form a liquid/gas tight seal and to allow maintenance on heater 109 by unscrewing heater 109. Other attachments are also contemplated (e.g., heater 109 may be welded to chamber 100). In some embodiments, a dial or other control on heater 109 may be used to increase/decrease heat production of heater 109. In some embodiments, heater 109 may be controlled electronically by control firmware. Heater 109 may be powered by an alternating current (AC) source or a battery (e.g., a direct current (DC) source). In some embodiments, multiple heaters 109 may be used (e.g., a series of heaters 109 distributed around and/or inside chamber 100). In some embodiments, heaters 109 may be connected directly to chamber 100 and/or baffles 115a-c. Heater 109 may heat chamber 100 and/or baffles 115a-c to a temperature based on a type of oil and/or gas being separated. In some embodiments, if the oil is a compressor oil and the gas is a heavy hydrocarbon gas, heater 109 may heat chamber 100 and/or baffles 115a-c to a temperature approximately in a range of 200-300 degrees Fahrenheit (° F.) (e.g., 250° F.)). Other temperatures and temperature ranges are also contemplated. In some embodiments, chamber 100 may be wrapped in an insulation cover 125 (e.g., to hold in heat and prevent burns from contact with chamber 100) (only portions of cover 125 are shown for clarity—in some embodiments, insulation cover 125 may wrap around most of the exterior of chamber 100). In some embodiments, only a portion of the exterior of chamber 100 may be wrapped in insulation cover 125.

In some embodiments, the mesh of baffles 115a-c may be heated through conduction, convection, and/or radiation from heater 109. As the oil and gas contacts the mesh, the oil and gas may be heated by conduction, convection, and/or radiation. Baffles 115a-c may spread out the gas as the gas travels through and around baffles 115a-c and provide more contact area between the gas and the heated metal of baffles 115a-c. The heat may also further separate the oil and gas. The heat and acceleration of the gas from the interaction between the gas and baffles 115a-c may keep the gas at a constant velocity and prevent the gas from absorbing into and diluting the oil. In some embodiments, the gas may not have a constant velocity, but the gas's velocity may still be influenced by the baffles 115a-c. For example, the gas may have a greater local velocity exiting the baffles 115a-c than the gas would experience in the absence of the baffles 115a-c. In some embodiments, the gas's velocity and increased temperature may keep the gas from liquefying and combining with the oil.

Figure 2A:
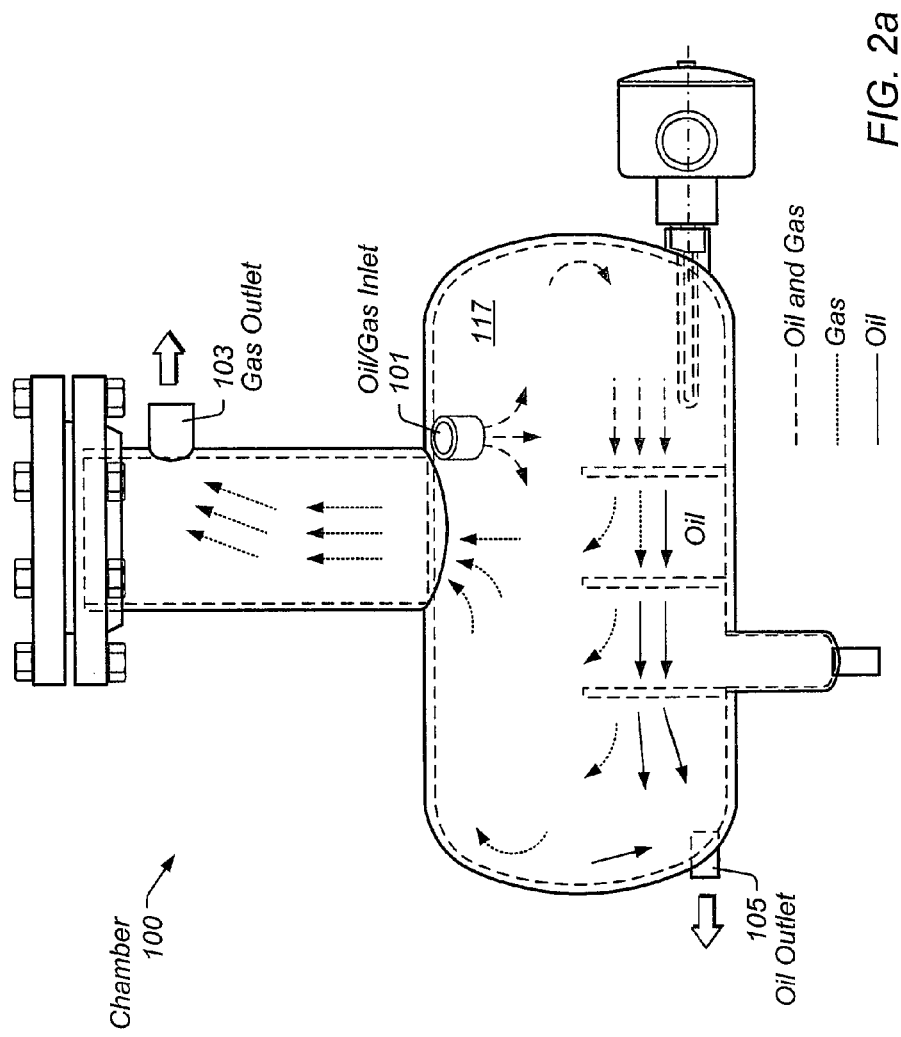
Figure 6A:
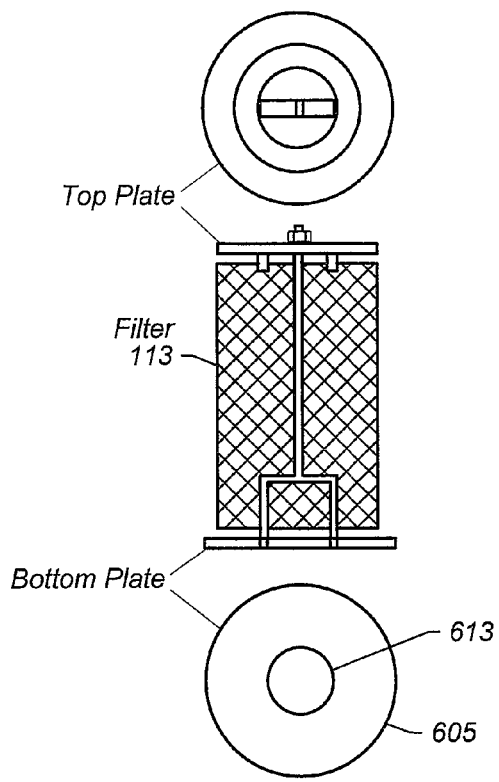
FIGS. 6*a-d* illustrate a filter for the chamber, according to an embodiment.
Figure 6B:
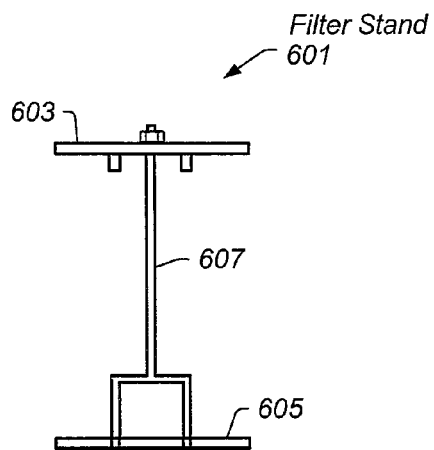
Figure 6C:
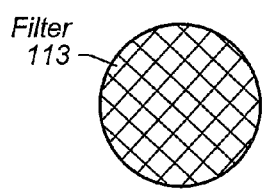
Figure 6D:

FIG. 2a illustrates a flow pattern of the oil and gas, according to an embodiment. In some embodiments, oil and gas may enter chamber 100 at inlet 101. In some embodiments, the oil may flow along a bottom of chamber 100 and/or flow along a side of chamber 100. The gas may rise to a top portion of chamber 100. In various embodiments, the oil may exit chamber 100 at outlet 105 and the gas may leave chamber 100 from gas outlet 103. In some embodiments, the gas may be filtered though filter 113 prior to exiting chamber 100 (e.g., see FIG. 1). Filter 113 may include a metal mesh for catching oil suspended in the gas as the gas flows over and around filter 113 (other gas filters are also contemplated). Filter 113 may be cylindrical (e.g., see cross section in FIG. 6c), planar (e.g., see cross section in FIG. 6d), etc. Filter 113 may be mounted to filter stand 601 (e.g., see FIGS. 6a-b). Filter stand 601 may include lower mount portion 605 for holding a bottom of filter 113 and top mount portion 603 coupled to bottom mount portion 605 through threaded interface 607. Top mount portion 603 may be coupled to filter 113 and may be rotated relative to bottom mount portion 605 (via threaded interface 607) to increase/decrease tension on filter 113. In some embodiments, flange 123 may provide an access point to filter 113 (e.g., to clean/replace filter 113). Flange 123 may be opened by unscrewing the coupling bolts. Other methods of accessing filter 113 are also contemplated. In some embodiments, lower mount portion 605 may include a plate with hole 613. In some embodiments, lower mount portion 605 may be approximately in a range of 4-8 inches in diameter (e.g., 6 inches in diameter). In some embodiments, hole 613 may be approximately in a range of 1 inch to 4 inches in diameter (e.g., 2.5 inches in diameter). Other dimensions for lower mount portion 605 and hole 613 are also contemplated. Other configurations for lower mount portion 605 are also contemplated (e.g., lower mount portion 605 may include several holes). In some embodiments, oil caught by filter 113 may flow onto bottom portion 605 and through outlet 195 (see FIGS. 1 and 3) where it may flow through a scavenge line back to the compressor. In some embodiments, oil may also fall through hole 613 and down into the oil at the bottom of chamber 100. In some embodiments, outlet 195 may also include a valve to a bleed line leading to an exterior of chamber 100. The valve may be closed during normal operation, and may be opened, for example, to bleed oil/pressure from the chamber 100 if needed (e.g., during maintenance, to check oil flow through scavenge line, etc.)

In some embodiments, baffle 115c may include a solid portion 119 extending from a contact point between chamber 100 and baffle 115c to a point above the contact point, e.g., as depicted in FIG. 5b. The solid portion 119 may impede a flow of fluid such as water (and/or other impurities) along the bottom of chamber 100. For example, as oil and water flow along the bottom of chamber 100, oil may flow over the top of the water and the solid portion 119 while the water may be under the oil in the flow and stopped by the solid portion 119. In some embodiments, solid portion 119 may include a solid portion of metal coupled to the metal mesh of the rest of baffle 115c. Solid portion 119 may include a solid bar (e.g., a solid metal bar) welded (e.g., with a seal weld) to a bottom of metal mesh of baffle 115c (and/or, for example, welded to inside of chamber 100). Other solid portions are also contemplated (e.g., a wier plate). In some embodiments, baffle 115c may be approximately one foot across (and/or may match the diameter of main cylinder 197) at the top of baffle 115c and solid portion 119 may have a height of approximately 1 inch. Other dimensions and configurations are also contemplated. Liquid drain 111 may be used to catch and/or drain impurities such as water that are impeded by solid portion 119 from flowing through to oil outlet 105. Liquid drain 111 may include a pipe extending from chamber 100 with an elliptical section welded onto the pipe. Liquid drain 111 may include a valve coupled to the pipe and/or elliptical section that may be opened to drain the impurities. Other drain 111 configurations are also contemplated.

Figure 7:
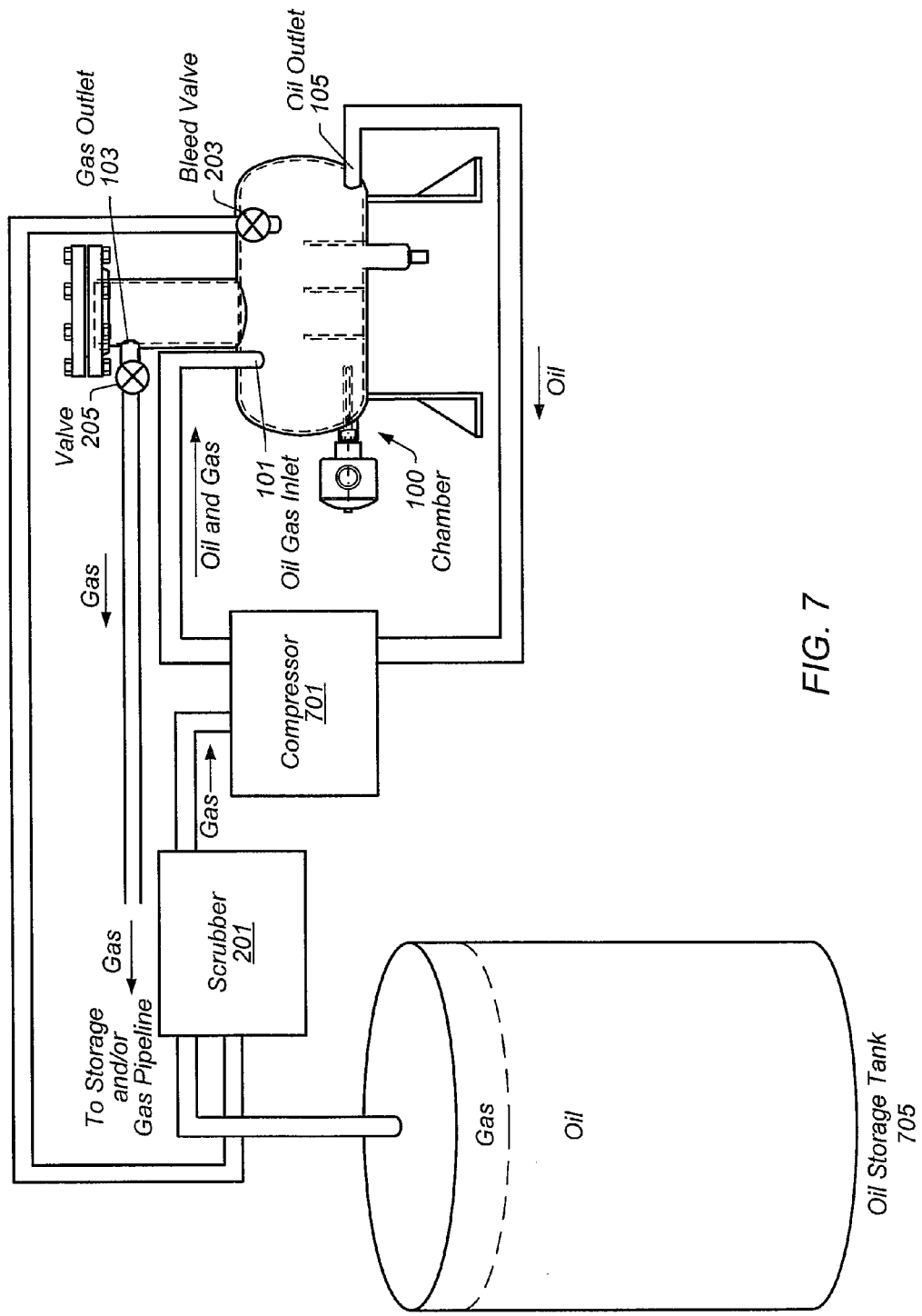
FIG. 7 illustrates a vapor recovery process, according to an embodiment.

FIG. 7 illustrates a vapor recovery process, according to an embodiment. Oil may be stored in oil storage tank 705. For example, oil pumped from the ground may be stored in local oil storage tank 705 until it is transported to a refinery. Gas released from the stored oil may build up inside oil storage tank 705. Compressor 701 (e.g., a scroll or screw compressor) may be used to pump the gas out of oil storage tank 705 (e.g., to deliver the gas to a different storage tank or a gas pipeline). In some embodiments, compressor 701 may use compressor oil to move/compress the gas. Compressor 701 may be hermetically sealed to prevent exterior air/oxygen from leaking into the compressed gas line and prevent oil and gas from leaking to the exterior. In some embodiments, a suction scrubber may be positioned between oil storage tank 705 and compressor 701 to collect oil that condenses out of the gas pulled from oil storage tank 705 (the collected oil may be returned to oil storage tank 705). In some embodiments, chamber 100 may receive the gas and oil (e.g., compressor oil) through inlet 101 from compressor 701. The compressor oil may leave the chamber 100 through oil outlet 105 and the gas may leave through gas outlet 103. In some embodiments, the oil may travel back to compressor 701 (e.g., at a differential pressure approximately in a range of 10-20 psi) to be reused in compressing/transporting additional gas. Other differential pressures are also contemplated. From gas outlet 103, the gas may be directed to storage and/or a gas pipeline. In some embodiments, compressor 701 and chamber 100 may be mounted to the ground or a moveable platform (e.g., a trailer). For example, mounting brackets 123a-b (see FIG. 1) may be bolted to the ground or a trailer.

In some embodiments, a variable frequency drive (VFD) may be used to drive compressor 701. The VFD may cycle compressor 701 between periods of increased and decreased compression. Compressor 701 may be operated at an increased rate of compression when there is a build-up of gas in oil storage tank 705 and may be operated in a decreased compression rate (e.g., low compression or in an inactive state) when the gas in oil storage tank 705 is at a low pressure. The low compression state may reduce energy requirements of the pump and/or may reduce oxygen leakage into the gas and oil lines. Cycling between increased and decreased compression rates may also increase the life of the equipment.

When compressor 701 is operating in a low compression state, chamber 100 may allow residual gas in chamber 100 to vent from bleed valve 203 to scrubber 201 while continuing to heat the oil in chamber 100 through heater 109 (e.g., see oil and gas flows in FIG. 2b). As seen in FIG. 2b, impurities in the oil (e.g., hydrocarbons, water, etc.) may be heated out of the oil and may also vent through bleed valve 203 to be cleaned by scrubber 201 before being released to the atmosphere. In some embodiments, when the low compression state is detected, valve 205 may close while bleed valve 203 is opened. In some embodiments, opening bleed valve 203 may normalize the pressure in chamber 100 to match atmospheric pressure. Valves 203 and 205 may include ball valves, butterfly valves, diaphragm valves, gate valves, globe valves, hydraulic valves, plug valves, needle valves, solenoid valves, check valves, etc. Other valve configurations are also contemplated. For example, there may not be a separate bleed valve 203 and impurities may vent through gas outlet 103 (which may be left open during the low compression state). A switch may divert exiting impurities from gas outlet 103 to scrubber 201. During the increased compression state, the switch may divert gas to a gas line and/or storage. In some embodiments, a valve may be positioned at oil outlet 105 (in some embodiments, there may not be a valve at oil outlet 105).

In some embodiments, pressure sensor 107 (e.g., a differential pressure gauge/transducer) may measure a pressure of the interior of chamber 100 (e.g., as depicted in FIG. 1). The pressure sensor 107 may be mounted directly to chamber 100 for a more precise, accurate pressure reading of chamber 100 (other placements are also possible (e.g., in a line leading to chamber 100)). Changes in compression state may be detected by pressure sensor 107 and/or relayed by compressor 701 or electronics controlling compressor 701. The indication of compression state may be used to signal valve 205 to close and valve 203 to open.

In various embodiments, other sensors and indicators may also be used. For example, sightglass 301 may be used to show an oil level in chamber 100. Sightglass 301 may be coupled to inlets 303 and 305 to chamber 100. In some embodiments, inlets 303 and 305 may be continuously open or may be opened through valve 309. An oil level in chamber 100 may be shown visually through sightglass 301 (which may include a transparent portion). For example, oil from inside chamber 100 may enter inlets 303/305 and rise to the same oil level 307 in chamber 100 and sightglass 301 (due to the same pressure in sightglass 301 and chamber 100). This may provide an external indication, through the transparent portion of sightglass 301, of oil level 307 in chamber 100. Temperature probe 193 is another example of a sensor for chamber 100. Temperature probe 193 may include a temperature sensor for detecting a temperature of the interior of chamber 100 (and, for example, the oil in chamber 100). The temperature may be relayed, for example, to a display, digital readout, etc. The temperature may also be relayed to control circuitry for chamber 100 (e.g., control circuitry may shutdown the compressor and/or chamber 100 if the temperature exceeds a safe level).

Figure 8:
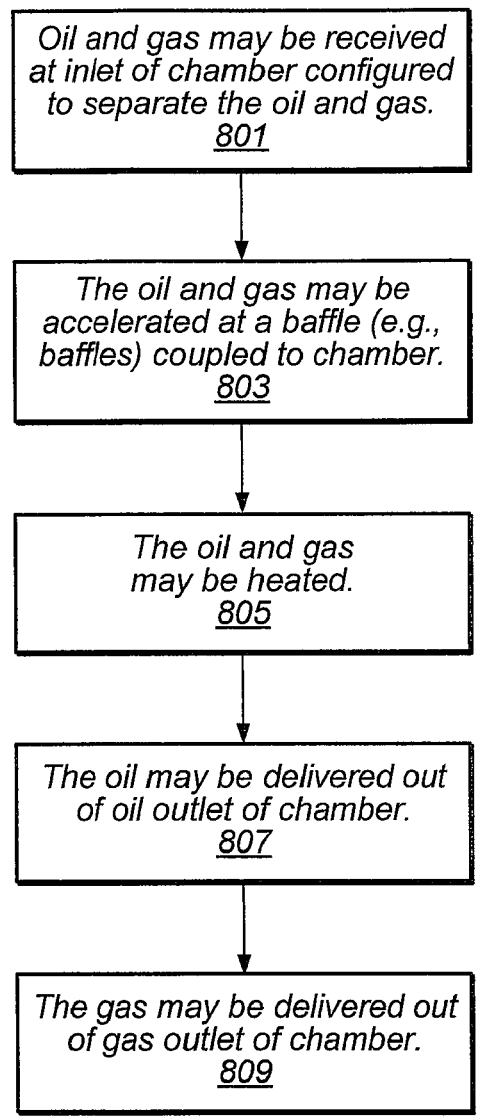
FIG. 8 illustrates a method for separating oil and gas, according to an embodiment.

FIG. 8 illustrates a method for separating oil and gas, according to an embodiment. It should be noted that in various embodiments of the methods described below, one or more of the elements described may be performed concurrently, in a different order than shown, or may be omitted entirely. Other additional elements may also be performed as desired.

At 801, oil and gas may be received at inlet 101 of chamber 100 configured to separate the oil and gas. In some embodiments, oil and gas may be received from compressor 701, oil storage tank 705, etc.

At 803, the gas (and/or oil) may be accelerated at a baffle (e.g., baffles 115a-c) coupled to chamber 100. For example, the gas may be accelerated as it passes through the openings in the mesh of baffles 115a-c. In some embodiments, oil droplets passing through the openings in the mesh may remain substantially undiluted by gas passing through the openings with the oil droplets.

At 805, the oil and gas may be heated (e.g., heated through contact with baffles 115a-c and/or chamber 100). In some embodiments, baffles 115a-c and/or chamber 100 may be heated by heater 109.

At 807, the oil may be allowed to exit oil outlet 105 of chamber 100. In some embodiments, gas may not exit oil outlet 105 because the oil in chamber 100 may cover oil outlet 105. In some embodiments, oil may not cover oil outlet 105 (e.g., the gas may exit gas outlet 103 without being blocked from oil outlet 105).

At 809, the gas may be allowed to exit gas outlet 103 of chamber 100. In some embodiments, valve 205 may be opened to allow gas to exit gas outlet 103. In some embodiments, valves 203 and 205 may be controlled by a controller, computer, etc. that may be executing programming instructions for monitoring conditions of chamber 100 and operating to open and close valves 203 and 205 as needed according to the preprogrammed instructions (and/or according to received user input).

In some embodiments, a compressor supplying the oil and gas to inlet 101 may cycle between different pressures. For example, the compressor may be a scroll compressor that cycles between a high pressure (e.g., when moving gas out of an oil storage tank) and a lower pressure (e.g., when the compressor is in a low pressure or idle mode (e.g., zero pressure) to wait for gas to build up in the top of the oil storage tank). Chamber 100 may be configured to separate oil and gas (e.g., see flowchart of FIG. 8) during the high pressure cycle. During the low pressure cycle (e.g., 0 psi to a pressure less than the high pressure) chamber 100 (e.g., through heater 109) may heat the oil to vaporize any impurities in the oil. In some embodiments, gas flow from gas outlet 103 may also be inhibited (e.g., by closing valve 205). In some embodiments, a separate bleed line may be opened (e.g., by opening bleed valve 203) to allow vaporized impurities to leave chamber 100. During the high pressure cycle, valve 205 may be opened and valve 203 may be closed. Other valve configurations are also contemplated. In some embodiments, a controller may monitor pressure in chamber 100 through a pressure sensor 107 (e.g., a pressure gauge) to detect the drop and rise in pressure between the cycles. The controller (e.g., a microprocessor with a memory) may open and close valves 203 and 205 as appropriate for the cycle. In some embodiments, the controller may receive signals from the compressor to determine what cycle the compressor is in. Other sources of information to the controller are also contemplated.

Figure 9:
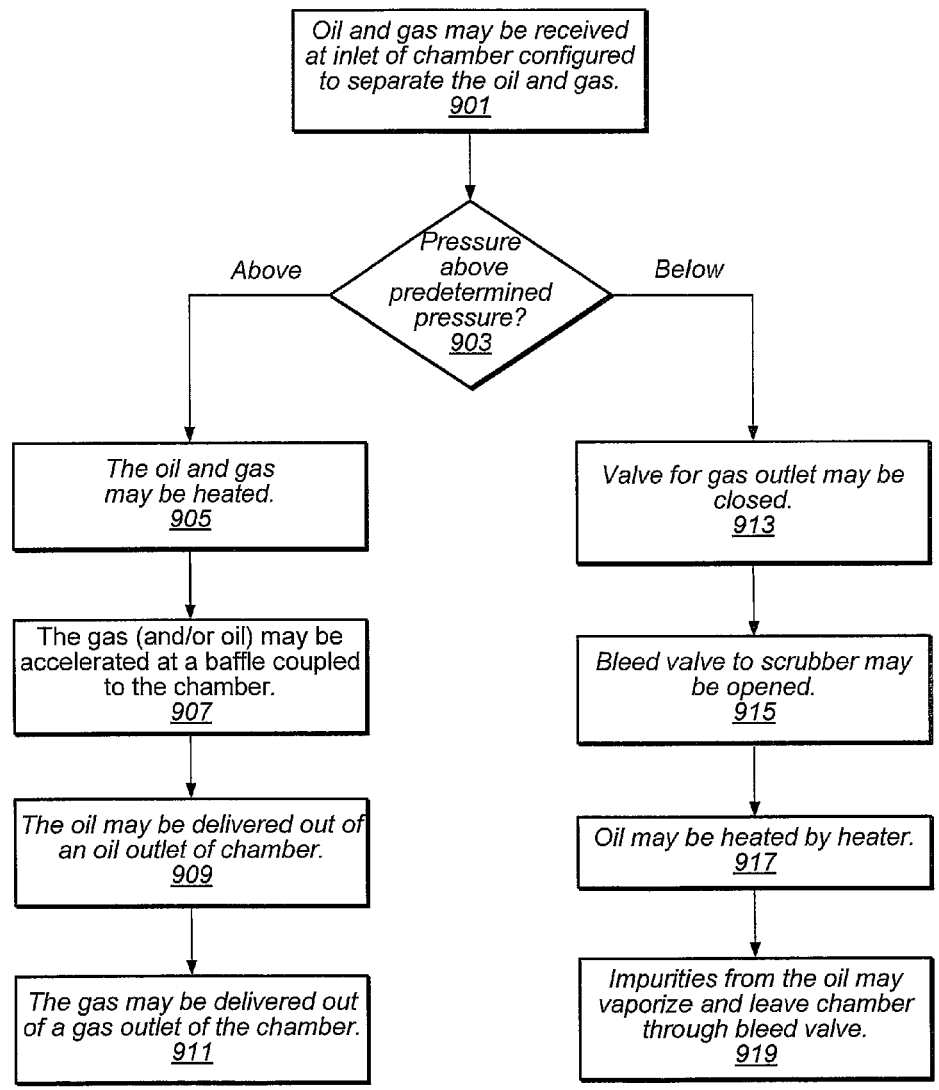
FIG. 9 illustrates a method for separating oil and gas at two or more operating pressures, according to an embodiment.

FIG. 9 illustrates a method for separating oil and gas at two or more operating pressures, according to an embodiment. It should be noted that in various embodiments of the methods described below, one or more of the elements described may be performed concurrently, in a different order than shown, or may be omitted entirely. Other additional elements may also be performed as desired.

At 901, oil and gas may be received at inlet 101 of chamber 100 configured to separate the oil and gas. In some embodiments, the oil and gas may enter inlet 101 at varying pressures (e.g., alternating between two or more pressures).

At 903, pressure changes (which may correspond to changes in compression states of compressor 701) may be detected (e.g., by pressure sensor 107 and/or relayed by compressor 701 or electronics controlling compressor 701). In some embodiments, the change in pressure may be due to a scroll compressor cycling between low and high pressure compression cycles. In some embodiments, the scroll compressor may be a variable pressure scroll compressor operable to cycle through a range of pressures. Other sources of the change in pressure are also contemplated. In some embodiments, the pressure and/or pressure change may not be detected. For example, information may be conveyed from the compressor to chamber 100 indicating whether the compressor is in an increased compression state or a decreased compression state (e.g., on or off).

In some embodiments, chamber 100 may have two or more modes of operation. For example, when pressure in chamber 100 is above a predetermined pressure (e.g., when the compressor is on and/or operating at an increased state of compression), chamber 100 may be operating in a first mode. When pressure in chamber 100 is below a predetermined pressure (e.g., when the compressor is off and/or operating at an decreased state of compression), chamber 100 may be operating in a second mode. In some embodiments, the predetermined pressure may be approximately 60 psi. Other predetermined pressures are also contemplated. For example, the predetermined pressure may be in a range of 60 to 100 psi, 0-60 psi, 100-1000 psi, etc). In some embodiments, the predetermined pressure may correspond to other pressures (e.g., a pressure of the gas exiting the chamber, a pressure inside the compressor, etc).

In some embodiments, a pressure of chamber 100 may be detected (e.g., by pressure sensor 107) to determine if the pressure is above a predetermined pressure. In some embodiments, information, for example, from the compressor (e.g., in a signal indicating whether the compressor is on/off, in an increased compression state/decreased compression state, etc.) may be used to determine if a pressure in chamber 100 is above a predetermined pressure. For example, if the compressor is on and/or in an increased compression state, the pressure in chamber 100 may be assumed to be greater than the predetermined pressure without necessarily measuring the pressure in chamber 100. During a first mode of operation (e.g., corresponding to the compressor being on and/or operating at an increased state of compression such that the pressure is above the predetermined pressure):

at 905, the oil and gas may be heated in chamber 100;
at 907, the gas (and/or oil) may be accelerated at a baffle (e.g., baffles 115*a-c*) coupled to chamber 100;
at 909, the oil may be allowed to exit oil outlet 105 of chamber 100; and
at 911, the gas may be allowed to exit gas outlet 103 of chamber 100.

During a second mode of operation (e.g., corresponding to the compressor being off and/or operating at a decreased state of compression such that the pressure is below the predetermined pressure):

at 913, valve 205 for gas outlet 103 and 105 may be closed;
at 915, bleed valve 203 to scrubber 201 may be opened;
at 917, oil may be heated by heater 109; and
at 919, impurities from the oil may vaporize and leave chamber 100 through bleed valve 203.

Embodiments of a subset or all (and portions or all) of the above may be implemented by program instructions stored in a memory medium or carrier medium and executed by a processor. For example, the various valves (e.g., valves 203, 205, etc.), compressors, sensors (e.g., pressure sensor 107), etc. described herein may be coupled to one or more controllers, computers, etc. that may include processors coupled to memory mediums with program instructions for implementing the various methods described herein (e.g., which may be performed automatically). A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
receiving oil and gas at an inlet of a chamber, wherein the chamber is configured to separate the oil and the gas, wherein the oil and the gas enter the inlet at varying pressures;
heating the oil and the gas;
wherein if the pressure inside the chamber is above a predetermined pressure, the method comprises:
allowing the oil to exit a first outlet of the chamber;
allowing the gas to exit a second outlet of the chamber;
wherein if the pressure inside the chamber is below the predetermined pressure, the method comprises:
venting impurities, vaporized from the oil when the oil is heated, out of the chamber.

2. The method of claim 1, wherein the pressure inside of the chamber is detected by a pressure sensor coupled to the chamber.

3. The method of claim 1, wherein receiving the oil and the gas at the inlet of the chamber comprises receiving the oil and the gas from a compressor configured to cycle between at least a mode of increased compression and a mode of decreased compression.

4. The method of claim 3, wherein the compressor is a scroll compressor.

5. The method of claim 1, wherein the chamber is configured to inhibit flow of gas through the second outlet when the oil and the gas are entering the chamber at a pressure below the predetermined pressure.

6. The method of claim 1, wherein the chamber is configured to vent the impurities to a scrubber when the pressure is below the predetermined pressure.

7. The method of claim 1, wherein when the pressure is below the predetermined pressure, the method further comprises:
opening a valve to the third outlet; and
closing a valve to the second outlet.

* * * * *